United States Patent Office 3,458,896
Patented Aug. 5, 1969

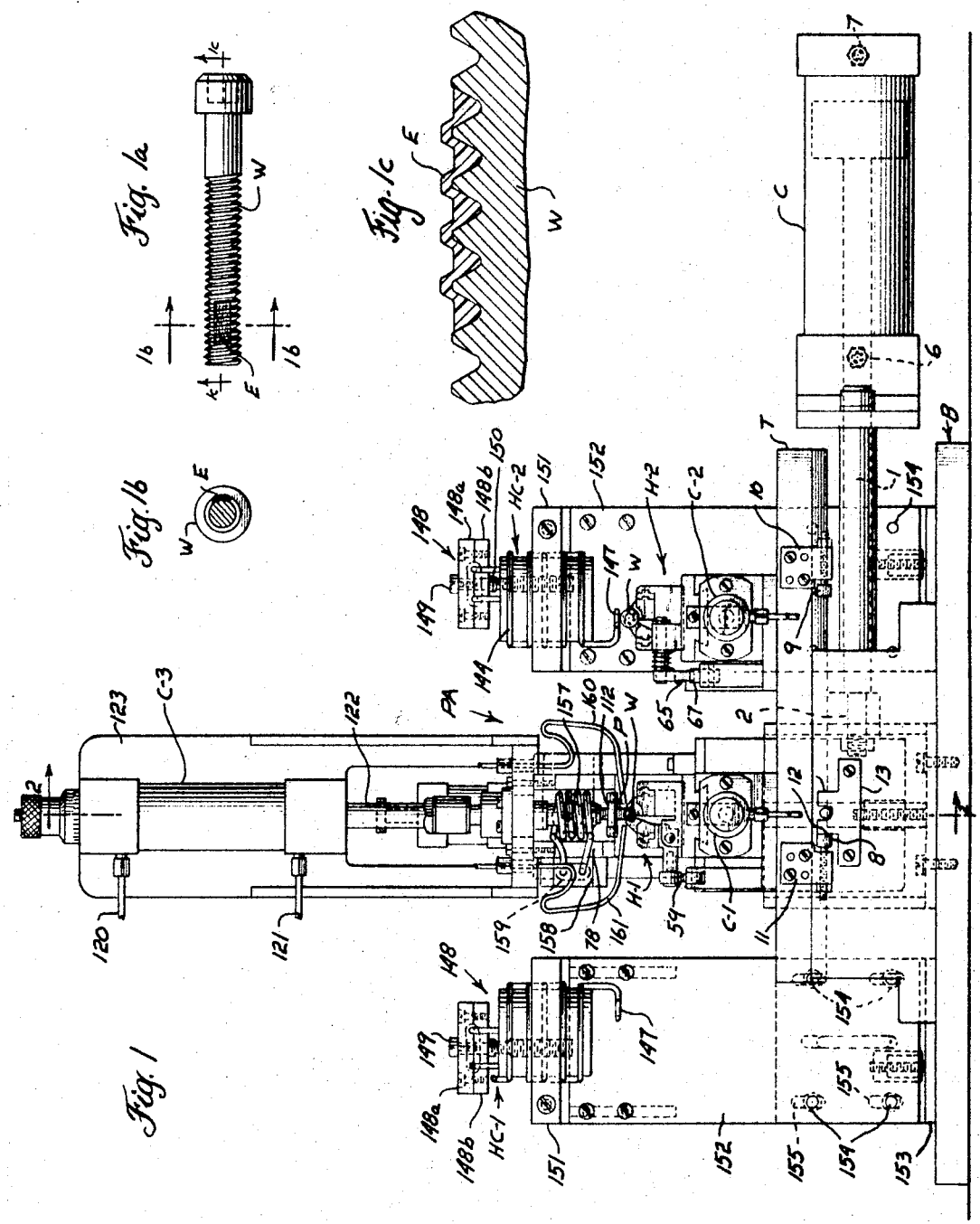

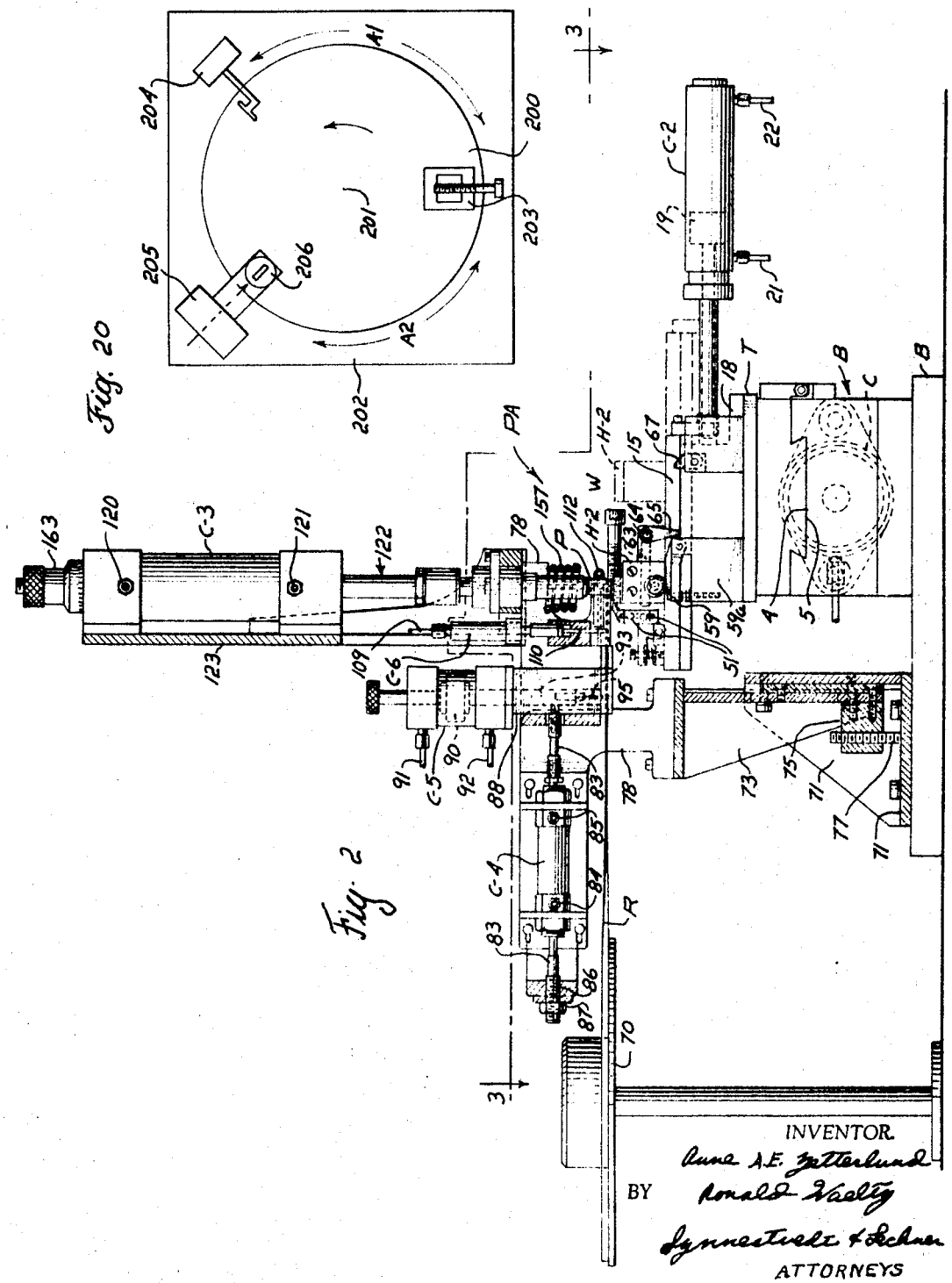

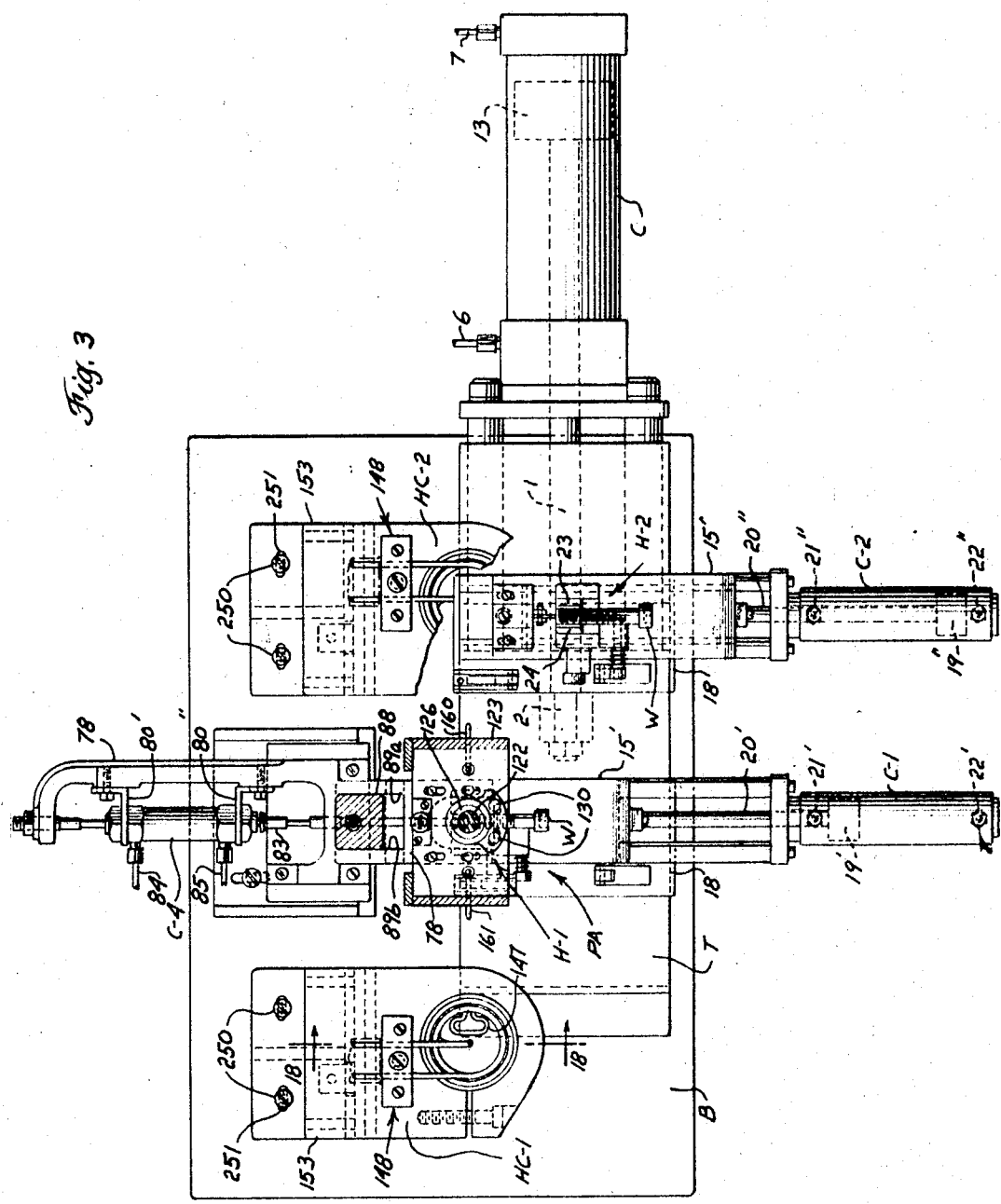

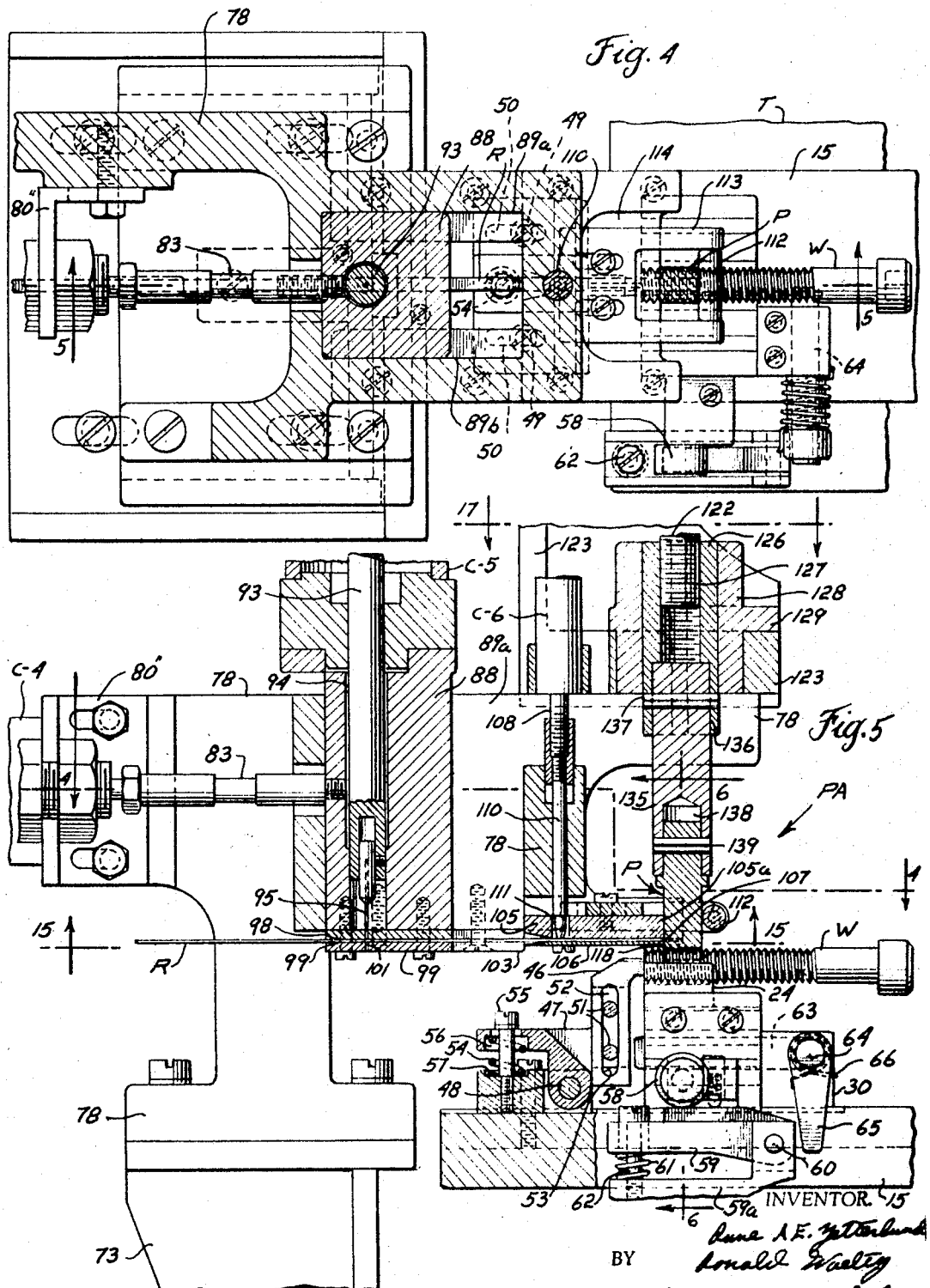

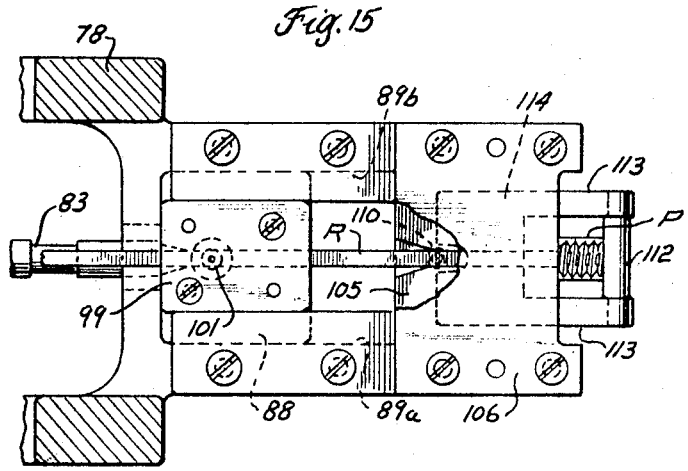
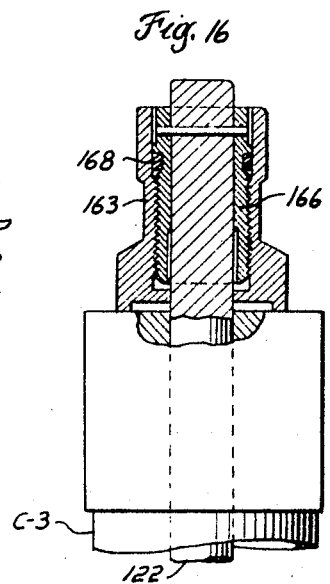
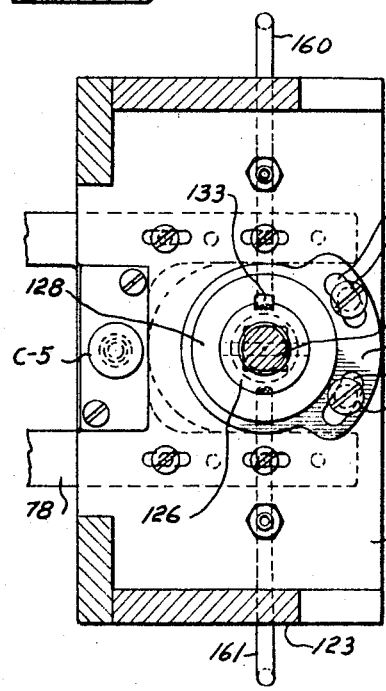
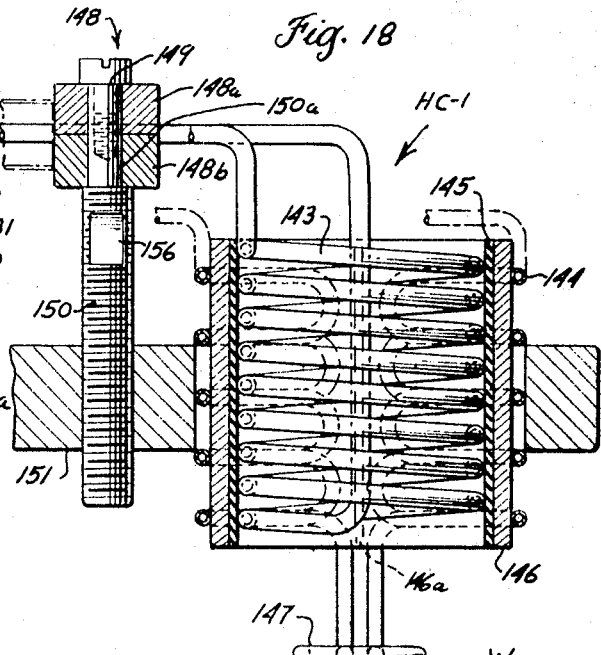
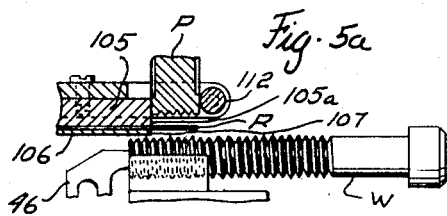
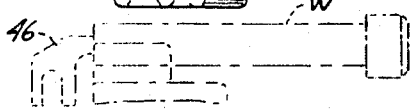

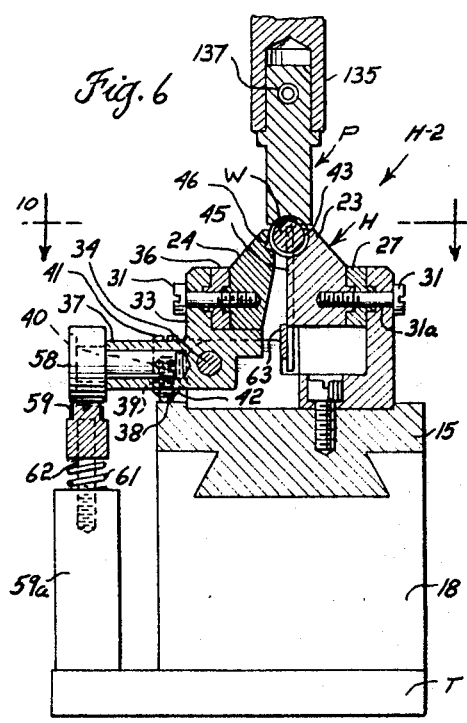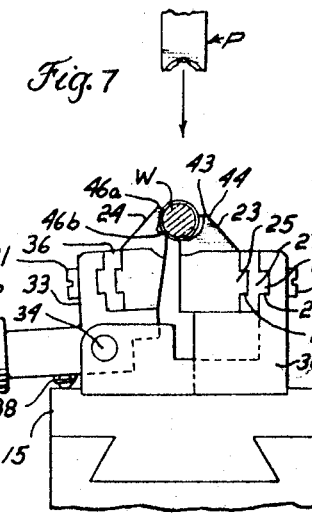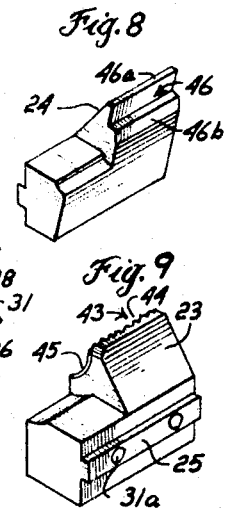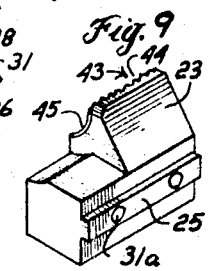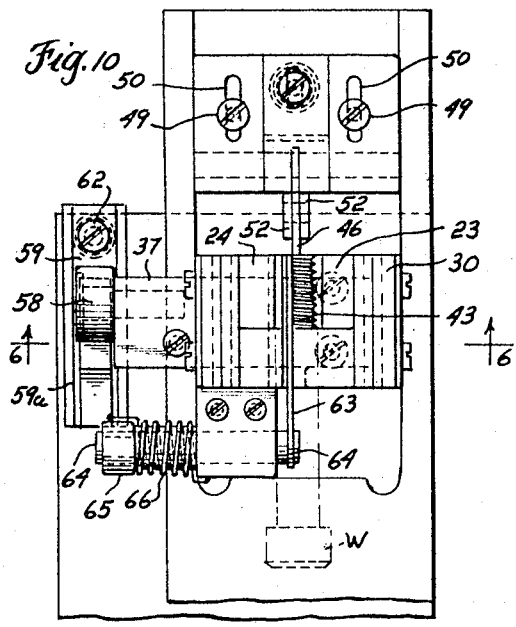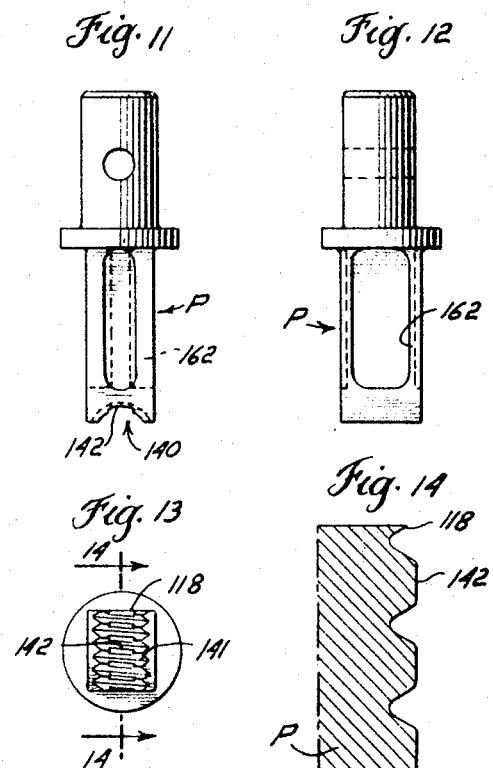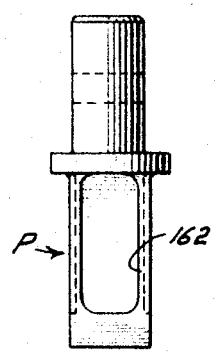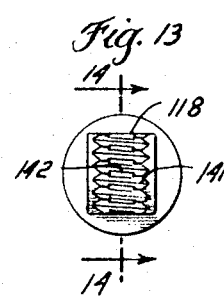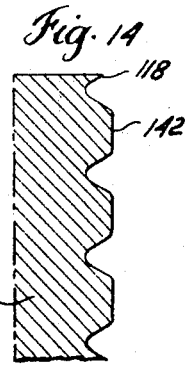

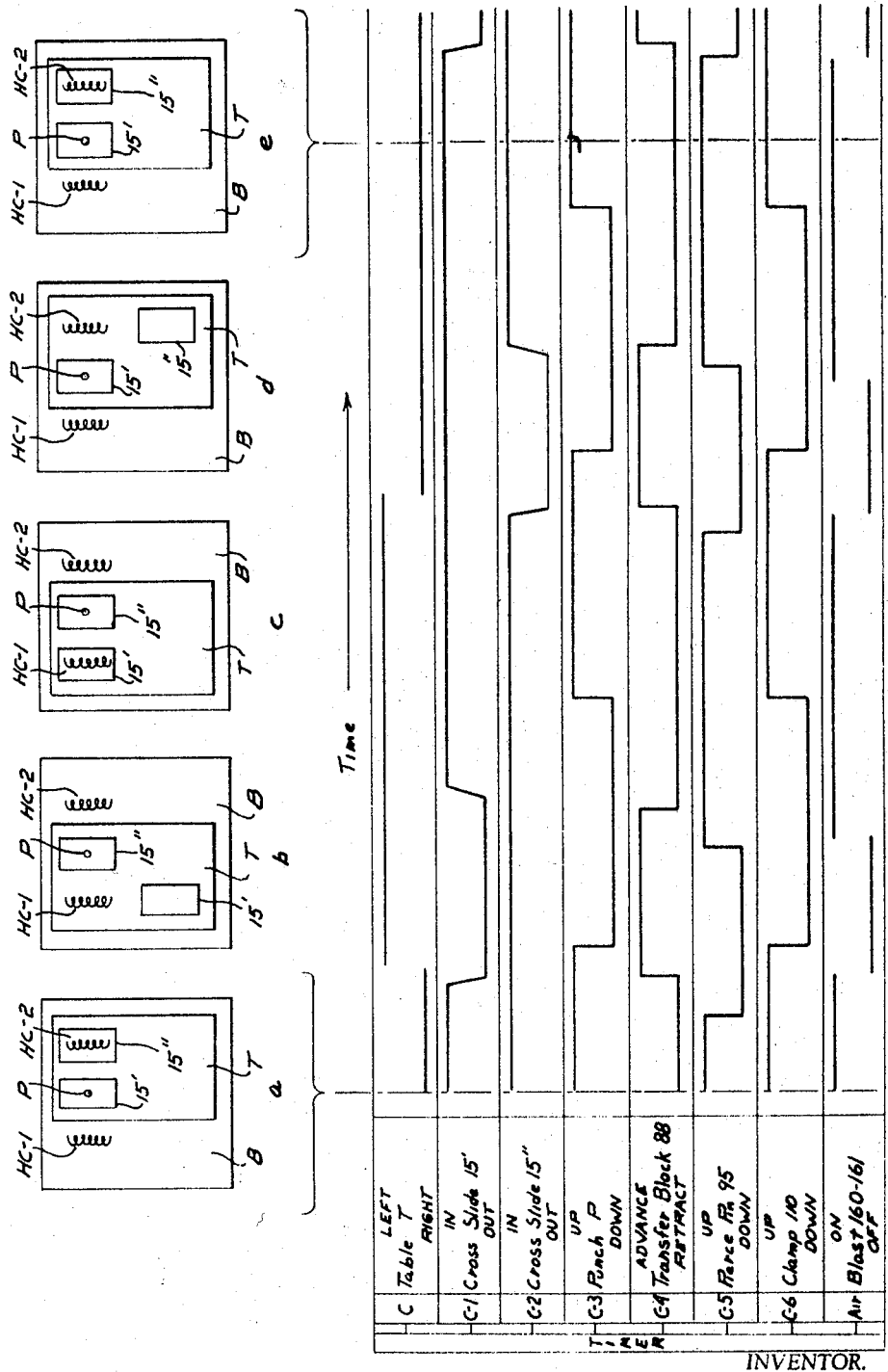

3,458,896
PLASTIC APPLICATOR AND PROCESS
Rune A. E. Zetterlund, Willow Grove, and Ronald Waeltz, Hatboro, Pa., assignors to Standard Pressed Steel Co., Jenkintown, Pa., a corporation of Pennsylvania
Filed Dec. 27, 1965, Ser. No. 516,654
Int. Cl. B29c 27/12
U.S. Cl. 18—5
10 Claims

ABSTRACT OF THE DISCLOSURE

A machine for applying a plastic element to a workpiece. The workpiece is heated and a prescribed amount of plastic is positioned between the heated workpiece and a heated punch. The punch, upon movement toward the workpiece, presses the plastic against the workpiece. With the punch in this position and the plastic pressed against the workpiece, both the punch and the workpiece are cooled.

---

This invention relates to apparatus for applying organic thermoplastic materials to substrates and especially to metallic substrates. The invention is particularly useful in applying the plastic material to localized areas of either flat or irregular (non-planar) surfaces. Thus, for example, the invention is readily adapted for the automated application of a surface bonded plastic locking element to the threads of a threaded fastener and the invention will be primarily illustrated in the reference to the manufacture of a self-locking bolt having a plastic locking element, but it is not thereby to be construed as being of such limited applicability.

The patent to Joseph P. Villo (No. 3,093,177) relates to a novel improvement in thread locks in which the self-locking characteristic is provided by fusing a nylon plastic composition to surface of the threads. In addition certain plastic laminates are useful, inter alia, in producing a modified and improved thread lock that is similar in certain respects to the type of locking element disclosed in the Villo patent.

The present invention is applicable to producing thread locks of the type contemplated in the Villo patent, to thread locks of the type contemplated by Epstein et al., and to thread locks made using plastic materials and bonding techniques different from those involved in either the Villo patent or in the Epstein et al. application. Hereinafter, such thread locks will sometimes be referred to collectively as bonded thread locks to distinguish them from the type of thread locks where a plastic plug is inserted into a hole or groove drilled or machined in the body of the threaded device.

The method and apparatus disclosed in the Villo patent for applying the type of locking element involved in that patent is not particularly well suited for high speed or automated production either with nylon alone, or when using the laminates of Epstein et al., or when using other adhesively or mechanically bondable plastic that have thermoplastic properties; one reason being that in reproducibly forming uniform and strong bonds between the plastic and the substrate it is important that certain rather critical time, temperature and pressure relationships be employed.

The operating conditions will vary widely with the particular type of plastic to be applied and the particular substrate involved; therefore, any equipment must be highly flexible, be capable of being controllably operated under a wide variety of conditions so as to permit the easily adapted to meet specific conditions dictated by the properties of the plastic and the substrate.

The apparatus of the present invention are especially suited for sustained automated operation and will permit the intimate application of predetermined quantities of various thermoplastic materials to a localized area on a substrate and particularly to externally threaded devices in a uniform and readily reproducible manner and thereby enable producing high strength bonds without adversely affecting the characteristics of either the plastic or the substrate.

In accordance with one of the apparatus aspects of this invention, the apparatus comprises a machine for applying a plastic element to the surface of a workpiece, said machine comprising a workpiece holder, a loading station, a workpiece heating station, a plastic application station, and means for sequentially transporting the workpiece holder from the loading station to the heating station, from the heating station to the plastic application station and from the plastic application station back to the loading station, said transporting means being adapted to position the holder at each of said stations for a predetermined time interval, said machine being further characterized in that:

(1) said workpiece holder is adapted to position the workpiece so that a predetermined portion of the surface area is exposed, (2) said heating station including means capable of heating the exposed fastener surface portions to an elevated temperature, (3) said plastic application station including a punch assembly and an indexing mechanism for feeding plastic to the punch assembly, (4) said punch assembly including a punch member and means timed for moving the punch member from a first position to a second position and for retracting the punch to the first position during the interval when the workpiece holder is positioned at the plastic application station, said first punch position being spaced apart from the workpiece holder and said second punch position involving a pressing engagement of the punch face with surface portions of the workpiece to which plastic is to be applied, (5) said indexing mechanism being adapted to deliver and position a predetermined quantity of plastic into the path of travel of the punch member before it reaches the second position, (6) means for cooling the punch member and the workpiece when the punch is in the second position, and (7) means for heating the punch member when the punch is in the first position.

The objects, advantages and details of the invention will be fully understood upon reference to the following description of an illustrative embodiment of the invention, when taken in light of the accompanying drawings in which:

FIGURE 1 is a front elevational view of the apparatus of the present invention;

FIGURE 1a is a view of a fastener having a plastic locking element bonded thereto;

FIGURE 1b is a sectional view taken along the lines 1b—1b of FIGURE 1a;

FIGURE 1c is an enlarged sectional view along lines 1c—1c of FIGURE 1a;

FIGURE 2 is a vertical section taken approximately on the lines 2—2 of FIGURE 1, with certain parts appearing in elevation, and certain other parts omitted for the sake of clarity of illustration;

FIGURE 3 is a plan section taken on the lines 3—3 of FIGURE 2;

FIGURE 4 is an enlarged plan view, partly in section, taken approximately on the line 4—4 of FIGURE 5;

FIGURE 5 is an elevation of the indexing or material transport mechanism, the punch assembly and a workpiece holder in operating position at the plastic application station;

FIGURE 5a is a simplified view of portions of FIGURE 5 showing the punch in its downward stroke taken just prior to the shearing operation;

FIGURES 6 and 7 are sectional and elevation views of the holding fixture showing the clamping fingers and actuating mechanisms;

FIGURE 8 is an isometric view of the left hand clamping finger of FIGURES 6 and 7;

FIGURE 9 is an isometric view of the right hand clamping finger of FIGURES 6 and 7;

FIGURE 10 is a plan view of the holding fixture of FIGURE 6, taken on the line 10—10 of FIGURE 6;

FIGURES 11 and 12 are front and side views, respectively of the punch;

FIGURE 13 is a bottom view of the punch shown in FIGURES 11 and 12;

FIGURE 14 is an enlarged fragmentary view of the thread profile on the punch face taken on line 14—14 of FIGURE 13;

FIGURE 15 is a plan view of the guide arrangement for the ribbon locking upwardly along the line 15—15 of FIGURE 5;

FIGURE 16 is a detail view, illustrating the micrometer adjustment for the punch;

FIGURE 17 is a plan section on the line 17—17 of FIGURE 5, illustrating the punch squaring apparatus;

FIGURE 18 is a section taken on line 18—18 of FIGURE 3;

FIGURE 19 illustrates schematically the positioning of the various components at different times in the operating cycle and sets forth a timer program for controlling a typical operation;

FIGURE 20 illustrates schematically another embodiment of apparatus made in accordance with this invention.

FIGURES 1a, 1b and 1c show a workpiece—i.e., a bolt W having a plastic locking element E bonded to the threads.

The apparatus of the invention for the application of such locking elements to a bolt or the like includes means for positioning the workpiece and subjecting it to various operations. In the illustrative embodiment of the invention, a pair of workpiece holding fixtures H–1 and H–2 (shown in FIGURES 1–2) grip and immobilize the workpiece—i.e., an externally threaded device—so that the surface portion to which the plastic element is to be secured is exposed. Although the holding fixtures could be stationary and the associated equipment movably mounted, we prefer to mount the workpiece holders for sequential timed movements between a plurality of stations at which the various operations of loading the fastener, heating the fastener (HC–1 and HC–2), applying the plastic material to the fastener (PA) ejecting the fastener and returning the holder to the loading station take place.

Thus, in the illustrative embodiment of FIGS. 1 to 3 this is accomplished by linear movements of the holders between limits in each of two different directions. Specifically, the holding fixtures H–1 and H–2 are mounted on a table T which is in turn slideably mounted for movement on and relative to base B. The fixtures are aligned on the table so that the axes of fasteners held by the fixtures are parallel. A pressure cylinder C drives the table back and forth in the table plane on the base between first and second limits of travel enabling the holders to be sequentially positioned and aligned with the plastic application station.

The holding fixtures H–1 and H–2 are each also mounted on separate cross slides for independent movements in a plane generally parallel to but offset from the plane of table movement and move along parallel axes extending transversely of the direction of movement of the table. The fixtures H–1 and H–2 are independently driven by means of pressure cylinders C–1 and C–2.

Movements of the table T and of the holding fixtures H–1 and H–2 in timed relation to one another causes each holding fixture to follow paths that serve to successively position each holder at each of the aforementioned processing stations in the prescribed sequence.

Considering the movements of an individual workpiece in its holder H–1: the workpiece e.g., a bolt is fed to the holder at its loading station. The holder is then moved on its cross slide by cylinder C–1 to position the workpiece at its heating station HC–1. After the surface of the workpiece has reached the desired temperature, the table T is moved by cylinder C to move the workpiece from its heating station HC–1 and position it at the plastic application station PA. After the plastic has been applied to the workpiece, the holder is returned to the loading station by appropriate activation of cylinders C and C–1. In moving the holder from the application station back to the loading station, the workpiece is ejected from the holder. The second workpiece follows an identical sequence of operations but they are so timed that the second workpiece moves into the plastic application station by the movement of the table that moves the first workpiece out of the plastic application station and returns it to the loading station.

The heating station has means for heating the surface of the workpiece to which the plastic element is to be secured to an elevated temperature. The elevated temperature should be such that the heat loss in moving the workpiece to the plastic application station will lower the surface temperature to a temperature above the softening point and within the melting range of the particular plastic involved.

At the plastic application station PA, there is a punch assembly and indexing means for feeding predetermined quantities of plastic to the punch assembly. The punch assembly includes a puncher or punch P that has a face preferably shaped so that it has a profile generally conforming to the exposed surface of the workpiece gripped in the holding fixture to which the plastic element is to be applied. The punch is mounted for axial movement toward and away from the plane of the table T by means of a pressure cylinder C–3.

The plastic material which is to be bonded to the workpiece W is supplied to the punch assembly in the form of a ribbon R. In the illustrated embodiment, the ribbon is advanced by an indexing means which includes a pair of two way pressure cylinders C–4 and C–5. While the punch P is in its raised or retracted position with respect to the workpiece, the cylinder C–5 is actuated to drive a piercing pin through the ribbon, and cylinder C-4 is then operated to advance the pierced ribbon to a position beneath and in alignment with the face of the punch.

Upon delivery of pressure to the cylinder C-3, the punch is moved downwardly to shear off and press the plastic material into intimate contact with the workpiece as will be described in more detail hereinafter. After the application of the plastic has been completed and the punch is retracted, the holding fixture H-1 is moved away usually by the simultaneous actuation of cylinders C and C-1 and the workpiece having the plastic element affixed thereto is ejected from the fixture and the fixture returned to the loading station.

With the foregoing general description in view, the various components of the illustrative embodiment of the invention will now be described in greater detail.

The pressure cylinder C is mounted on the base B in any suitable manner and drives a piston rod 1 which is bolted to a downwardly extending lug 2 mounted on table T. As viewed in FIGURE 2, the table T is slideably mounted on the base B by means of a tongue and groove track arrangement shown at 4 and 5. Pressure can be directed to the cylinder C through either of air lines 6 and 7, to reciprocate the piston rod back and forth and cause the table to move between first and second limits of travel determined by the length of the piston stroke.

Adjustable stops 8 and 9 are threaded in brackets 10 and 11 secured to the table T on axes parallel to the table track. The stops are aligned to engage with abutment surfaces 12 of an abutment bracket 13 which is bolted to the base B. The engagement of one of the stops 8 or 9 strikes with an abutment surface 12 as the piston drives the table on its forward and reverse stroke, limits and adjustably controls horizontal movement of the table by the desired amount.

The workpiece holders are mounted on the table for movement in a plane generally parallel to and offset from the plane of the table, such holder movement being in directions different from and preferably perpendicular to the linear path of the table.

Thus, as viewed in FIGURES 1 and 5-7, the workpiece holding fixtures H-1 and H-2 are mounted on cross slides 15' and 15" which moves in separate parallel dovetailed tracks carried by and secured to table T by fixed support 18 (FIGURE 6). The cross slides move between first and second limits of travel in a line transverse to the line of table movement and in a plane parallel to the table track plane. In FIGURE 2, holder H-2 is shown in its first limit of travel in phantom lines and in the second limit of travel in full lines.

A pair of two-way pressure cylinders C-1 and C-2 are fixedly mounted with respect to the support 18 to permit independent actuation of holders H-1 and H-2 relative to the table. Pistons 19' and 19" having piston rods 20' and 20" connected thereto are slideably mounted within the cylinders. Each of piston rods 20' and 20" is connected to an associated slide 15' and 15". Air lines 21' and 22' (21" and 22") are connected to each of the cylinders to permit independent reciprocating movements of the piston rods and hence, the holding fixtures back and forth across the table.

As may be best seen upon reference to FIGURES 6 through 10, each workpiece holder includes a pair of clamping fingers 23 and 24 between which a threaded workpiece is adapted to be placed, either manually or by a suitable automatic loader.

To insure correct alignment and positioning of the clamping fingers, a rib 25 extends along one side of finger 23 and rides in a groove 26 in a spacer member 27 having a rib 28 which fits in a groove 29 in the bracket 30. Machine screws 31 are employed to fasten the finger to the bracket, and the screw shank passes through elongated openings 31a in bracket 30 to enable accurately controlling the alignment of the punch threads with the threads of a bolt held in the workpiece fixture.

Finger 24 is mounted in a bracket 33 which is pivotally mounted with respect to bracket 30 by means of a pivot pin 34 aligned on an axis offset from but parallel to the axis of fingers 23 and 24. Finger 24 is secured to the bracket 33. A ribbed spacer 36 fits between the bracket 33 and the clamping finger 24 as may be seen in FIGURES 6 and 7. Spacer members 27 and 36 permit clamping fingers of different sizes to be used and facilitates changeover to accommodate different sizes and shapes of the workpiece.

The pivotally mounted bracket 33 is provided with a laterally extending arm 37. A ball 38 is mounted in a vertically extending bore 39 in the arm 37. A spring 40 shown in FIGURE 6 is fitted within the bore on top of the ball. A set screw 41 is threaded into the bore and compresses the spring so that it urges the ball downwardly against the periphery of a retainer collar 42 mounted in the opening of the bore underneath the arm 37. The spring loaded ball rides on the flat upper surface of the slide 15 and uniformly urges the arm 37 and the clamping finger 24 to rotate on pivot 34 toward the finger 23.

As viewed in FIGURES 6, 7, 9 and 10, the clamping finger 23 is provided with an elongated threaded recess 43 of arcuate cross section. The recess faces upwardly and inwardly towards the finger 24. The curved surface of recess 43, when viewed in elevation, as for example in FIGURE 7 preferably describes an arc of slightly more than 90° to provide bottom support and lateral support to the workpiece. Thus, the lower edge 45 of the threaded recess should extend beneath and slightly beyond the line of application of force of the punch P (shown by the arrow in FIGURE 7) to provide horizontal support for a fastener held by the fingers when the punch applies and presses the plastic material into contact with the fastener threads, and the upper edge 44 should be above the longitudinal axis of the workpiece to provide full lateral support.

Clamping finger 24 is provided with an L shaped recess 46 which faces and is axially aligned with the threaded recess in clamping finger 23. To insure proper clamping action and lateral support, the upper edge 46a of the finger 24 should be positioned to engage the workpiece above the longitudinal axis of the workpiece. The two recesses form an elongated pocket or groove within which a fastener is held so that the threads to which plastic is to be applied to be exposed.

When in the position shown in FIGURE 7, the pivot 34 and the spring loaded ball arrangement permits finger 24 to yield somewhat as a bolt is pressed against upper leg the L shaped recess, thereby allowing the bolt threads to clear the threads in finger 23. The bolt can then be easily moved by the operator until its threads mesh with the threads of finger 23. When the operator releases the, the spring biased finger 24 urges the bolt against the finger 23 and holds it in that position with the threads enmeshed.

To insure uniform positioning of the plastic element and in order to locate the bolt in the proper axial position with respect to the pocket formed by fingers 23 and 24, we prefer to mount a yieldable stop 46 on the bracket 30. As can be seen in FIGURE 5, the screw loading stop 46 is adjustably supported on a bracket 47 which is in turn pivotally mounted 48 with respect to the bracket 30. Bolts 49, shown in FIGURE 10 and in dotted lines in FIGURE 4, pass through elongated slots 50 in the bottom portion 48 of the bracket 30 and permit the stops to be secured to the dovetailed slide 15 and to be adjustably positioned thereon thereby enabling the plastic element to be applied to any desired point along the length of the workpiece.

Machine screws 51 support the workpiece loading stop 46 between a pair of updright arms 52 integral with the bracket 47 (see also FIGURE 2). The stop 46 is provided with an elongated slot 53 through which the screws 51 pass to provide for vertical adjustment of the stop so that it can be accurately aligned with the end of bolts of different sizes.

To facilitate positioning of the workpiece the loading stop is spring biased to resist pivoting about pivot 48 when the tip of the workpiece is pressed against the toe of the loading stop. Thus, a coil spring 54 surrounds the shank of a machine bolt 55 which is threaded into the support 48 and acts as a spring guide. The spring seats in a recess 56 in the bracket and a recess 57 in the support and urges the bracket as well as the stop 46 in a clockwise direction, as viewed in FIGURE 5.

In operation, when one of the holding fixtures, for instance, the right hand fixture H–2 is viewed in FIGURE 3, is in the retracted position on the table (i.e., the loading sation) shown in that figure, the operator presses a bolt into the pocket formed between the fingers 23 and 24, initially pressing the bolt against the sides of recess 46 in the finger 24 (see FIGURES 6 and 7) so that that finger is rocked in the counter-clockwise direction as viewed in those figures. Finger 24 can rock far enough so that the threads of the bolt clear the threads in the finger 23. The bolt is then free to be moved axially in the recess until its end engages the loading stop 46 and slightly biases the spring 54. When the operator released the bolt, the spring loaded ball 38 urges the gripping finger 24 into engagement with the shank of the bolt and automatically moves (due to cam action of the bolt and finger threads) the workpiece axially into meshing registry with the threads of finger 23 and thereafter the bolt is held firmly in place.

After the bolt has been placed in the holding fixture, pressure is delivered to the cylinder C–2 through line 22″. The dovetail slide 15 and the workpiece holding fixture H–2 are thus moved from the dotted position shown in FIGURE 2 towards the position shown in full lines in that figure and positioned at the heating station HS–2.

During movement of the workpiece holder into the heating station, a roller 58 carried by arm 37 rides up on a horizontal cam ramp 59 secured to table T. This arrangement is best shown in FIGURE 5 and insures immobilizing the workpiece in subsequent operations. Preferably the forward end of cam ramp 59 is connected to table bracket 59a by a horizontal pivot pin 60 whose rotational axis is perpendicular to the direction of holder movement. The opposite end of the ramp is spring urged upwardly by means of a coil spring 61 mounted on the shank of a guide bolt 62. Guide bolt 62 passes through a hole in the end of the ramp 59 and is secured to the table bracket 59a. Spring 61 presses against the underside of ramp 59. As the roller 58 rides up on the ramp 59, the arm 37 and the finger 24 is rocked a further amount on the pivot pin 34 causing the finger 24 to clamp the fastener tightly against the finger 23. The resilient mounting for ramp 59 allows the ramp to yield somewhat to accommodate variations in workpiece size.

The apparatus of the invention also preferably includes means to eject the bolt from the workpiece holding fixture at the end of a treatment cycle. The ejection mechanism can best be seen in FIGURES 2, 5 and 10. It includes an elongated ejection arm 63 axially aligned with and mounted beneath the fingers 23 and 24. The arm 63 is connected to a pin 64 mounted for pivotal movement in a horizontal bore perpendicular to bolt axis in the bracket 30 which is secured to slide 15 (see FIGURES 5, 6, and 10). As is shown in FIGURE 6 arm 63 is spaced below and between the gripping fingers 23 and 24 and is free to move upwardly so that its free end 63 can project beyond the top surface of the fingers 23 and 24. A tripping lever 65 depends from the opposite end of the pin 64. A torsion spring 66, yieldably connects the tripping arm 65 to the pin 64. As shown in FIGURE 2, a tripping arm actuator or latch 67 is mounted on table T in the path of the tripping arm 65.

A preferred practice according to the invention includes the use of an induction heater to be described hereinafter, to heat the workpiece. In such cases, the fingers of the workpiece holder, the associated mounting brackets and the spacers should be made of materials that have considerably lower magnetic permability than the workpiece in order to insure heat build-up in the workpiece rather than in the fixture. Thus, we have found that stainless steel bolts could not be effectively heated for the purposes of this invention when held in a carbon steel fixture. The chrome-nickel superalloys such as type A–286 alloy steel can be employed for the holder components and will permit processing of workpieces of stainless steel as well as the more common oxide coated and cadmium plated carbon steel fasteners.

When the holding fixture moves from the dotted position shown in FIGURE 2 to the full line position, the tripping arm is rocked by the latch, but the spring connection permits movement of the arm with respect to the pin 64 without moving ejection arm 63. However, when the holding fixture moves in the reverse direction back to the dotted line position, the latch 67 engages and causes the arm 65 to pivot and urges the ejection arm 63 upwardly so that it strikes the underside of a bolt gripped between the fingers. The fingers have relaxed their grip on the bolt somewhat at this point because the cam follower or roller 58 will have moved down off the ramp 59. The ejection arm spring is tensioned sufficiently to overcome the remaining pressure exerted against the bolt by the fingers and ejection arm 63 forces the fastener upwardly free and clear of the holding fixture. The torsion spring 66 brings the ejection arm back after arm 65 has passed latch 67. If desired, suitable guide and conveyor structure may be provided on the cross slide 15 or on the base for receiving the ejected fasteners.

In carrying out the objects of the present invention, means are provided for maintaining the temperature of the bolt or workpiece at a temperature in the melting range of the plastic material. For this purpose, heating means are provided for heating the surface of the workpiece held in a holding fixture just before it is transferred to the plastic application station. As is illustrated, particularly in FIGURES 1 and 18, heating is accomplished by an induction heater having a primary coil 143 and a slotted 146a copper cylinder 146. The slotted cylinder is in effect a one turn secondary. The primary is nested within an insulating cylinder 145 which is surrounded by the copper cylinder 146 shown in FIGURE 18. This arrangement gives a high induced current in the secondary. Both the primary and the secondary are water cooled, the primary with water flowing continuously through it and the secondary by water flowing through water jacket 144 and foot 147.

A heating foot 147 is secured to the secondary coil 146 as shown in plan in FIGURE 3 and in elevation in FIGURE 18. Since all the current generated in the secondary must pass through this foot, it provides a means of concentrating a very high current in a small space so as to generate the magnetic flux necessary for heating the workpiece. Foot 147 is preferably of oval or rectangular cross section with the long axis of the oval being aligned with the axis of the fastener W which is to be processed. We have found that a foot so formed is quite effective in rapidly heating the surface portion of the threads of the fastener to which the plastic is to be applied to temperatures above the melting point of the plastic material. The primary coil 143 can be raised or lowered relative to the secondary to controllably vary the magnetic flux. Such adjustments are effected by a mounting assembly 148 including a two-piece mounting bracket 148a–148b which supports the primary coil leads. Bracket 148 is supported by and journaled on the shank 150a of adjusting screw 150 having driving flats 158 and is held in position by cap screw 149. The adjusting screw engages internal threads in a horizontal extending support bracket 151 on which the secondary coil is mounted. By turning the adjusting screw up or down the axial positioning of the primary within the secondary can be controlled.

As is illustrated in FIGURE 1, bracket 151 is secured to an angle plate 152 which is bolted to an angle bracket 153 by means of screws 154 which pass through elongated slots 155 in the bracket 152. Bracket 153 is secured to the base B, and as can be seen in FIGURE 3, it can be adjustably positioned thereon in the line of table movement by screws 250 which pass through elongated slots 251 in the foot of bracket 153. Vertical adjustment of the heating coil is achieved by varying the position of the plate 152 with respect to bracket 153, then locking the plate in position by means of screw 154. With this arrangement, the coil foot may be accurately positioned with respect to a bolt held by the holding fixture when the fixture is moved to the heating station.

The invention also includes mechanism for advancing or indexing a predetermined quantity of plastic material into a position so that it can be pressed into intimate engagement with the threads of a bolt or applied to the surface of the workpiece.

Turning first to FIGURE 2, a ribbon of the plastic material designated by the reference character R is shown extending from a storage reel 70 to the indexing and feed mechanism which is mounted on the machine base B. Typical ribbons useful for applying locking elements to bolts and the like range in size from about 0.050 inch in width and 0.010 inch in thickness for number #4–40 thread screws to 0.160 inch in width and 0.030 inch in thickness for 1″–8 thread screws—it being understood that these sizes are given for purposes of example only.

The mounting means for the feed or indexing mechanism includes a support bracket 71 which is bolted to the base B through elongated slots to permit positioning the bracket within limits on the base. A second pedestalled bracket 73 is mounted for vertical movement with respect to support bracket 71. An adjusting block 75 is bolted to bracket 73. The adjusting block is provided with a vertically extending threaded bore into which an adjusting screw 77 is threaded. Rotation of the screw 77 precisely controls the height of the support bracket 73 and of the indexing means mounted thereon with respect to the base and the table carried thereon.

A housing frame 78 (e.g. see FIGURES 3 through 5) is bolted to the top pedestal of bracket 73. A pressure cylinder C–4 is mounted on the frame 78 by means of a pair of angle brackets 80′ and 80″ positioned so that the piston rod 83 can be reciprocated horizontally. The angle brackets are bolted through elongated slots in the brackets to threaded holes in the frame 78. This arrangement provides for limited axial adjustment of the cylinder C–4 relative to the frame.

Air cylinder C–4 is a two way cylinder and is provided with a piston and piston rod 83 which is adapted to be moved between two limits of travel in a horizonal transverse plane as viewed in FIGURE 2. Air lines 84 and 85 are connected to the cylinder and are selectively operable to deliver air under pressure to opposite sides of the piston to drive the piston rod back and forth between its limits of travel. A threaded stop 86 that can be locked in position by means of nut 87, controls the length of stroke of the piston rod 83.

Piston rod 83 is connected to a transfer block 88 which is slidably mounted for movement in a plane parallel to the plane of the table with walls 89a and 89b of the housing frame 78 (see especially FIGURES 3 and 4) guiding the block. Transfer block 88 carries a pressure cylinder C–5 at its upper end. The piston 90 of cylinder C–5 is positioned for reciprocation on a vertical axis. Air lines 91 and 92 are connected to the interior of cylinder C–5 on opposite sides of the piston to selectively deliver air under pressure and drive the piston between vertically spaced limits of travel.

Piston rod 93 is connected to piston 90. As may be seen in FIGURE 5, the piston rod 93 rides in a vertically extending bore 94 within the transfer block 88. An axially aligned needle 95 is secured by a set screw in the lower end of the piston rod 90.

The ribbon of plastic material is fed through a slot or channel just wide enough and thick enough to accommodate and guide the ribbon. The slot is formed by a pair of ribbon guides 98 and 99 which are bolted to the bottom of the transfer block 88. A small vertically etxending opening 101 is located in the ribbon guides 98 and 99 in alignment with the needle 95. The needle 95 will be driven downwardly to pierce the ribbon when cylinder C–5 is pressurized through line 91. After a timed interval (during which the cylinder C–4 is operated to advance the transfer block 88, the needle 95, cylinder C–5 and the pierced ribbon R) cylinder C–5 is pressurized through line 92 to withdraw the needle from the ribbon.

A second set of ribbon guides 105 and 106 are bolted to the underside of the housing frame 78 as viewed in FIGURES 4 and 5. The guides 105 and 106 also form a slot or channel just wide enough and thick enough to accommodate and guide the ribbon R, and position it just above the threads of the bolt to which the locking element is to be applied (see FIGURE 5a) and in the line of travel of the punch P.

To facilitate threading the ribbon through the guides, the channels are somewhat wider at the openings that are nearest the ribbon supply reel 70.

Turning again to FIGURES 2 and 5, a two-way air cylinder C–6 is shown mounted on top of the frame housing 78. A piston rod 108 is driven by cylinder C–6, which is supplied with pressure through a line 109. A flat nosed clamping pin 110 is attached to the end of piston rod 108. Clamping pin 110 is moveable through an opening 111 in the upper ribbon guide 105 towards and away from a position in which it engages and clamps the ribbon R between its flat nose and bottom guide member 106. Pressurization of cylinder C–6 is timed to take place after the ribbon has been advanced by cylinder C–4 the transfer block 88 and the needle or piercing pin 95 assembly. The clamping pin serves to immobilize the ribbon during the subsequent shearing operation. The clamping pin is not released from clamping engagement with the ribbon until after cylinder C–4 returns transfer block 88 assembly and its associated member to its initial retracted position in the frame housing and holds the ribbon in place during such refraction.

As shown in detail in FIGURES 4 and 5, the punch P which presses the ribbon R into intimate engagement with a workpiece, is part of an assembly mounted on frame 78. The punch is adapted for vertical movement and is positioned to move in a path immediately adjacent (i.e., to ride in contact with the face 105a of the guide) the ribbon orifice 107 between ribbon guides 105 and 106 from which the ribbon emerges.

A punch guide roller 112 is mounted between the arms 113 of a bifurcated support bracket 114. The roller axis is aligned parallel to the face 106a of the ribbon orifice. Bracket 114 is mounted for lateral adjustment with relation to the ribbon orifice 107. This permits the use of punches of different sizes and configurations and facilities changeovers. Punch is adapted to ride between and in contact with the face of the ribbon orifice 107 and the roller 112. The punch face has a shearing edge 118 which is juxtaposed adjacent and cooperates with a shear edge 119 on guide member 106 to shear off the ribbon emerging from the ribbon orifice.

In operation, the ribbon of plastic material on the reel 70 is fed by the operator into the opening between the guides 88 and 99 and through the space between the guides 105 and 106. Line 91 is pressurized to drive piston 93 downwardly causing the ribbon piercing pin 95 to pierce the plastic ribbon. Line 84 is pressurized and cylinder C–4 drives piston rod 83, transfer block 88 with cylinder C–5 and piercing needle 95 to the right as viewed in FIGURE 2. Since the needle has pierced the plastic ribbon it carries the ribbon forwardly until the end extends underneath the face of the punch P as shown in FIGURE 5a. Pressure is then delivered through line 109 to cylinder C-6 moving clamping pin 110 downwardly to clamp the ribbon in position. At or about this time, the workpiece holder carrying the heated bolt is transported to the plastic application and aligned so that the surface to which plastic is to be applied is positioned directly beneath the punch, and the punch is moved down by means described hereinafter, shears off a piece of ribbon projecting from orifice 107, and presses it into intimate engagement with the workpiece. The piercing pin is disengaged from the ribbon upon pressurization of line 92 to actuate cylinder C-5 and lift the piercing pin. Thereafter, and while clamping pin 110 is still engaged, pressurization of line 85 actuates cylinder C-4 to effect retraction of transfer block 88 and the mechanisms carried thereby. After a preset time interval, the clamping pin and the punch are moved upwardly. The cycle can then be repeated to advance the ribbon in preparation for application of the next workpiece to be positioned beneath the punch.

As noted briefly above, the punch P is adapted to be reciprocated in a vertical path. This is accomplished by a two-way pressure cylinder C-2 which can be selectively pressurized either through line 120 or line 121. The cylinder is fitted with a piston that drives piston rod 122 back and forth in a vertical path between a retracted or raised position (relative to a workpiece aligned in the path of travel) and a position that brings the face of the punch into pressing engagement with the surface of a workpiece in the path of punch movement. The cylinder is mounted on an upright support bracket 123 bolted to the frame 78.

As viewed in FIGURES 3, 5 and 17, a bushing 126 is engaged with the end 127 of the piston rod 122. The bushing is slideably mounted in a sleeve bearing 128. The bearing is provided with a flange 129 which rests on the base of bracket 123. Machine bolts 130 pass through circumferential slots 131 in the flange and these are threaded into holes in the bracket 123, and permit limited positioning of the punch about the axis of reciprocation of cylinder C-2.

As may be seen in FIGURE 17, sleeve 128 and the bushing 126 are aligned and prevented from rotating relative to one another by a key 133 between the sleeve and bushing and on which the bushing can reciprocate on its vertical axis.

A punch holder 135 (FIGURE 5) is secured in a recess 136 in the bushing 126. The holder is locked in place and prevented from rotating relative to the bushing by a spring pin 137 which is adapted to fit in transversely extending openings in the bushing and in the punch holder, when the holder is rotated to align the openings.

The punch P is in turn secured within a recess 138 in the end of holder 135 and is locked in place and prevented from rotating about the axis of reciprocation by means of a spring pin 139 which passes through transversely extending openings in the shank of the punch end in the holder respectively.

Referring now to FIGURES 11 through 14, a punch P for applying plastic locking elements to an externally threaded device is shown in detail. It will be understood that the configuration of the punch face can be varied to permit the desired contouring of the exposed plastic surface. In the illustrated embodiment for applying a locking element to a bolt or the like, the face of the punch is provided with a semi-circular recess 140. Internal threads 141 are cut across the face of the punch; these conform generally to the shape of the external threads of the workpiece to which the plastic is to be applied and they will generally mesh with the workpiece threads when the punch is moved downwardly and brought into pressing engagement with the workpiece. We prefer to include a small groove 142 truncating the punch threads and cut parallel to the axis of the punch threads at the center of the recess. The width of the groove is a little wider than the width of the ribbon. When the punch is properly aligned and mounted within the holder 135, the grove 142 will be in alignment with the feed path of the ribbon R, so that as the punch starts its downward movement, the sheared piece plastic ribbon will be positioned within the groove 142. The punch thereafter presses the piece of ribbon into engagement with the fastener threads. Where an externally threaded device is being processed to affix a locking element the punch thread configuration should be such that the plastic will be brought into conformity with the roots, flanks and crests of the external threads as a continuous coating—i.e., the crests of the external threads should not puncture the plastic.

In order to press the plastic into intimate engagement with the surface of the workpiece, the punch should be heated so that at the time it begins to press the plastic onto the workpiece the punch face is at a temperature above the softening point, but below the melting temperature of the plastic material; further, the punch temperature should not be so high that the plastic material will stick to the threads of the punch. This temperature will vary somewhat depending upon the plastic materials employed. To control the punch temperature, we provide an induction heating coil 157 which surrounds the punch and punch holder (see FIGURES 1 and 2) when the punch has been retracted with respect to the workpiece. The leads tothe heating coil are mounted in a support 158 shown in FIGURE 1. The support 158 is preferably adjustably mounted on frame 78 in order to vary the axial position of the coil 157 with respect to the punch P. An insert of insulating material 159 may surround the leads in order to prevent the transfer of heat from the coils to the other parts of the machinery. Thermostaticaly controlled means are employed to enable cooling water to be circulated through coil 157 to keep the coil at the require temperature level.

When the plastic is pressed against the workpiece, the temperature of the surface of the workpiece should be at a temperature slightly above the lower limit of the melting range of the plastic material, so that the material will flow into intimate contact with the threads. The temperature must not be so high, however, that it will cause excessive flow of the material, or enable the crests of the workpiece threads to break through the plastic covering. Moreover, when plastic laminates having an adhesive layer are employed there is a danger that excessive heating will cause the adhesive film to melt to quickly and flow out from under the protective layer and prevent effective bonding. Preferably, and as shown in FIGURE 1c, the material should be sufficiently softened so that it will flow into intimate contact with the workpiece threads in a continuous layer covering the crests, and also be in intimate contact with the roots and flanks.

In order to prevent overheating and to permit the punch to be retracted without having hot plastic adhere to the punch face and lift portions of the plastic from contact with the workpiece, we provide means for cooling the punch, the workpiece and harden the plastic. In the illustrated embodiment we employ a pair of air lines 160 and 161 which direct air onto the punch and workpiece and generally aligned with the pressed plastic element just before cylinder C-2 is actuated to retract the punch from pressing engagement with the workpiece.

The punch is provided with routed out or cut-away portions 162 on each of its vertical sides in order to significantly reduce the mass of the punch and enable the temperature of the punch to be quickly raised or lowered and thereby controlled within close limits. Because of the relatively small mass of the routed punch, the heating coil will raise the punch temperature to the required temperature level within a very short time, and the cooling air can quickly dissipate the heat. Further, in this connection, preferably the punch face material should be close grained and capable of taking a high polish so as to prevent plastic sticking thereto. For example, A–2 type air hardening tool steel (AISI) has been found especially satisfactory. Where induction heating is employed to heat the punch the build-up of heat in other parts of the apparatus is prevented by forming the punch holder 135 of a material having low magnetic permeability. While other materials might be employed, we have found that a porous cast aluminum-magnesium alloy (Almag 35) holder provides extremely satisfactory results.

Means are also provided for obtaining fine adjustment of the length of stroke of the punch P and of the pressure applied thereby. Where plastic locking elements are to be applied to externally threaded devices that are to meet certain MIL specifications, the punch should be adjusted so that the plastic covering the thread crests should not be greater than +0.003" with respect to the maximum major diameter of the bolt thread. As shown in FIGURE 16, a micrometer knob 163 is mounted on the upper end of the piston rod 122 of the cylinder C–2. The knob is provided with internal threads which cooperate with the external threads of a sleeve 166 that is fixedly secured to piston rod 122, a drag is provided by O-ring 168. Axial adjustment of the length of stroke of the piston within the cylinder C–2 is controlled by the setting of knob 163 with respect to the piston rod 122.

It has been found that the best locking action is obtained if there are no interruptions in the layer of plastic material bonded to the threads. For this reason, the length of stroke of the punch must be capable of being adjusted and controlled within very narrow tolerances, and the threads of the recess in the punch face must be accurately aligned with the fastener threads. Moreover, we have found that the shape of the profile of the internal threads in the recess of the punch face is critical insofar as insuring that the plastic material will cover the flanks, crests and the root area of the external threads of the fastener without interruptions. The juncture of the flanks of the workpiece threads and the flat crests should preferably be a curved surface having a radius of between 0.002 inch to 0.004 inch, in order to assure that interruptions in the platic layer of material do not occur.

Although the apparatus could be manually operated or automatically operated in various other ways, we prefer to control the sequence of operations as schematically illustrated in FIGURE 19 for a typical operation of the FIGURE 1 embodiment of the invention. The timer, which is of conventional construction, is programmed to open and close a series of switches at preselected intervals for predetermined intervals of time. These switches operate control mechanisms C, C–1, C–2, C–3, C–4, C–5, C–6, and the air blast. Each control mechanism typically includes solenoid operated valves to hold the various air lines opened and closed during selected portions of an operating cycle as indicated on the illustrative timer program chart shown in FIGURE 19.

FIGURE 20 illustrates a modified embodiment of the invention. A table 200 is mounted to rotate on its center 201 with respect to a base 202. A workpiece holder 203 is mounted on the table offset from the center 201. A heating coil is mounted on a bracket secured to the base and the heating foot 204 is positioned over the table 200 so that the workpiece can be brought into heating alignment therewith by rotating the table. At another portion of the machine, a plastic application assembly 205 (such as that employed in the FIGURE 1 embodiment) is mounted on a bracket secured to the base so that the punch 206 is positioned over the table in line with the path of the workpiece and so that the workpiece can be aligned with the punch by rotating the table.

The workpiece holder 203 is generally similar to the holder arrangement shown in FIGURES 6 and 7 except that bracket 30 is not mounted on a cross slide, instead it is bolted to the table and suitable camming arrangements in section A–1 actuate pivoted arm 38 to cause the holder to grip and immobilize the fastener, and other camming arrangements in sector A–2 actuate the ejection mechanism.

Where cadmium plated bolts or other workpieces that have coatings that should not be subjected to excessive heating it is advisable to employ two heating stations set to induce temperatures in the workpiece that are below the critical temperature range. For example, in the case of cadmium plated bolts, the plating will permanently discolor if the bolt is heated to temperatures above about 500° F. By having two low temperature stations and holding the workpiece thereunder for a longer time interval, the workpiece can be slowly and uniformly raised to the desired working temperature without localized over heating such as can occur with a single heater operating under conditions that quickly generate high temperatures in the workpiece.

For the purposes of this invention, any plastic material that has the chemical and physical properties desired for the end product can be used provided it has thermoplastic characteristics and will bond with the substrates by adhesion, fusion, a simple mechanical interlock on a rough or porous surface or any other bonding mechanism that can develop the strength needed to meet end use requirements.

Where the plastic is a material that is hydroscopic in character the machine and process should be operated in an environment having a controlled humidity. Thus, for example, the plastic laminate of Epstein et al. (application 437,283) should be applied under conditions where the relative humidity is not more than about 50% and usually between about 30–50% relative humidity in order to insure uniform bonding. Further in this connection such plastic should be stored in sealed containers or baked to drive off absorbed moisture before use.

Where the plastic is or includes a thermosettable component (for example the nylon-epoxy adhesive film of the Epstein application) the workpiece after discharge from the holding fixture must be subjected to a curing operation, in which the workpiece is heated under time and temperature conditions needed to harden the particular thermosettable material involved. In the case of the plastic laminate of Epstein et al., a one hour dry heat cure at 350° F. will serve to fully harden the resin and develop a high strength bond. Here too in order to insure uniform results, the curing operation should closely follow ejection of the processed workpiece from the machine at the unloading station.

In order to insure the development of uniform and reproducible bond strengths, the preferred operation of the present invention contemplates cleaning of the workpiece to remove dirt, grease and moisture before applying the plastic.

We claim:

1. A machnie for applying a plastic element to a localized area of a workpiece, said machine having:
   (1) a holder adapted to grip and position the workpiece so that the surface to which the plastic is to be applied is exposed,
   (2) means for heating the exposed surface of the workpiece,
   (3) a punch member,
   (4) means for moving the punch member from a first position to a second position, said first punch position being spaced apart from the workpiece and said second punch position involving a pressing engagement of the punch face and the surface of the workpiece to which the plastic is to be applied,
   (5) an indexing mechanism adapted to deliver and position a predetermined quantity of plastic between the exposed workpiece surface and the face of the punch member before the punch reaches the second position, (6) means for cooling the workpiece and the punch member when the punch is in the second position timed for actuation prior to retraction of the punch to the first position, and (7) means for heating the punch member when the punch is in the first postion.

2. A machine according to claim 1, wherein the workpiece is an externally threaded device and wherein said workpiece holder is adapted to grip and position the workpiece so that the threads in a predetermined portion of the threaded area to which the plactic is to be applied are exposed.

3. A machine according to claim 1 wherein the heating means for the workpiece is an induction heating device and wherein the workpiece holder is made of material having lower magnetic permeability than the wrokpiece.

4. A machine according to claim 1 wherein punch heating means is an induction coil that surrounds the punch when the punch is in the first position and wherein the punch is secured to a punch holder that is aligned within the induction coil when the punch is in the second position said holder being made of material having low magnetic permeability.

5. A machine for applying a plastic element to the surface of a workpiece, said machine comprising a workpiece holder, a loading station, a workpiece heating station, a plastic application station, and means for sequentially transporting the workpiece holder from the loading station to the heating station, from the heating station to the plastic application station and from the plastic application station back to the loading station, said transporting means being adapted to position the holder at each of said stations for desired predetermined time intervals, said machine being further characterized in that:

(1) said workpiece holder is adapted to position the workpiece so that those portions of the workpiece surface to which the plastic is to be applied are exposed, (2) said heating station including means capable of heating the said exposed surface portions to an elevated temperature, (3) said plastic application station including a punch assembly and an indexing mechanism for feeding plastic to the punch assembly, (4) said punch assembly including a punch member and means timed for moving the punch member from a first position to a second position and for retracting the punch to the first position during the interval when the workpiece holder is positioned at the plastic application station, said first punch position being spaced apart from the workpiece holder and said second punch position involving a pressing engagement of the punch face with surface portions of the workpiece to which plastic is to be applied, (5) said indexing mechanism being adapted to deliver and position a predetermined quantity of plastic into the path of travel of the punch member before the punch reaches the second position, (6) means for cooling the workpiece and the punch member when the punch is in the second position, (7) means for heating the punch member when the punch is in the first position.

6. A machine according to claim 5 wherein said workpiece holder transporting means including a table mounted for movement in the plane of the table between a first and second limit of travel, drive means for moving said table between said first and second limits of travel, means mounting said holder for independent movement from a first position to a second position on said table in a second plane offset from and generally parallel to the plane of movement of said table, and drive means for moving said holder in said second plane between said first and second positions.

7. A machine according to claim 5 having a first and second workpiece holder, a first and second loading station, a first and second heating station, and a common plastic application station for each pair of workpiece holders, each of said workpiece holders being mounted on the table so as to simultaneously move with the table in the direction of table movement, and each of said holders being mounted for independent movement with respect to one another in said second plane.

8. A machine according to claim 7 wherein the machine is timed so that as the first workpiece holder moves from the plastic application station to the first loading station, the second workpiece holder moves from the second heating station to the plastic application station; and as the second workpiece holder moves from the plastic application station back to the second loading station, the first workpiece holder moves from the second heating station to the plastic application station.

9. A machine according to claim 5 wherein said workpiece holder is mounted on a table adapted to be rotated about a center offset from the holder, and wherein rotation of the table sequentially positions the holder at the loading station, the heating station, the plastic application station and returns the holder to the loading station.

10. A machine for applying a plastic locking element to the threads of an externally threaded workpiece, said machine comprising a workpiece holder, a loading station, a workpiece heating station, a plastic application station, and means for sequentially transporting the workpiece holder from the loading station to the heating station, from the heating station to the plastic application station and from the plastic application station back to the loading station, said transporting means being adapted to position the holder at each of said stations for a predetermined time interval, said machine being further characterized in that:

(1) said workpiece holder is provided with a clamping mechanism adapted to be moved into and out of clamping engagement with a fastener and to position the workpiece so that the threads in a predetermined portion of the threaded area are exposed, (2) actuating means for said clamping mechanism, said means being activated to close the mechanism into clamping engagement on a workpiece and immobilize the workpiece with respect to the holder after the holder leaves the loading station and from the time the holder enters the heating station until it leaves the plastic application station, and means to open the clamping mechanism at a point in the return path between the plastic application station and the loading station, (3) said heating station including means capable of heating the exposed thread portions, (4) said plastic application station including a punch assembly and an indexing mechanism for feeding a ribbon of plastic to the punch assembly, (5) said punch assembly including a punch member whose work face is contoured to conform generally to the exposed workpiece threads to which plastic is to be applied and means timed for moving the punch member from a first position to a second position and for retracting the punch to the first position during the interval when the workpiece holder is positioned at the plastic application station, said first punch position being offset from the exposed thread portion of the fastener held in the workpiece holder and said second punch position involving a pressing engagement of the punch face with exposed thread portions of the immobilized fastener positioned at the plastic application station, (6) said indexing mechanism being adapted to feed plastic ribbon into the path of travel of the punch member as the punch moves from the first position to the second position, said indexing mechanism being provided with ribbon guide means positioned to cooperate with the moving punch to shear a predetermined length of the plastic being fed from the indexing mechanism and permit the sheared plastic portion to be applied to and pressed into conformity with fastener threads subtended by the punch face when the punch is in the second position, (7) means for cooling the workpiece and the punch member when the punch is in the second position, (8) means for heating the punch when it is in the first position, and (9) means for ejecting the fastener from the holder timed for actuation after opening the clamping mechanism and before the holder is re-positioned at the loading station.

References Cited

UNITED STATES PATENTS

| | | | |
|---|---|---|---|
| 2,342,041 | 2/1944 | De Bold | 18—5 X |
| 2,551,960 | 5/1951 | Meyer | 18—1 |
| 2,725,919 | 12/1955 | Brent et al. | 18—5 X |
| 2,850,765 | 9/1958 | Rus | 18—5 X |
| 3,172,149 | 3/1965 | Kornmayer | 18—1 |
| 3,203,041 | 8/1965 | Beuter et al. | 18—1 |
| 3,320,342 | 5/1967 | Vinson et al. | 18—11 X |

WILLIAM J. STEPHENSON, Primary Examiner

U.S. Cl. X.R.

18—1